Figure 1:
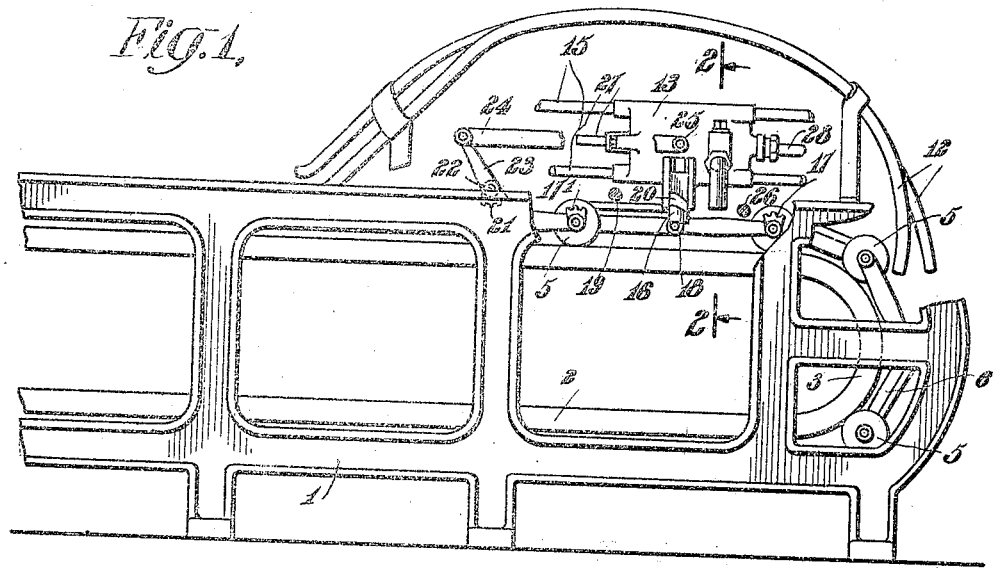

M. H. BERGEN.
WAFER BAKING APPARATUS.
APPLICATION FILED JULY 9, 1919.

1,374,419.

Patented Apr. 12, 1921.

Inventor
Martin H. Bergen
By his Attorney

UNITED STATES PATENT OFFICE.

MARTIN H. BERGEN, OF NEW YORK, N. Y., ASSIGNOR TO NATIONAL BISCUIT COMPANY, OF NEW YORK, N. Y., A CORPORATION OF NEW JERSEY.

WAFER-BAKING APPARATUS.

1,374,419.  Specification of Letters Patent.  Patented Apr. 12, 1921.

Application filed July 9, 1919. Serial No. 309,608.

*To all whom it may concern:*

Be it known that I, MARTIN H. BERGEN, a citizen of the United States, residing in the borough of Manhattan, city, county, and State of New York, have invented certain new and useful Improvements in Wafer-Baking Apparatus, of which the following is a specification.

My invention relates to a machine for baking wafers or cakes in a continuous process, and is an improvement upon the type of apparatus disclosed in Patent No. 353,837, granted December 7, 1886, to G. S. Baker. In an apparatus of the character referred to, baking pans are progressed by means of endless chains or the like through an oven, the pans being provided with lids which press the batter firmly against the surface of the pans. Devices are provided for unlocking and raising the lids at one end of the machine, a predetermined quantity of batter thereupon being injected on the pan by an automatic valve mechanism. In the further progression of the pan the lid is pressed down into its closed position, and there locked until the passage through the oven has been completed, when the lid is raised and the baked wafer sheet removed by an operator. The wafer sheets are thereafter cut up into suitable sizes.

In machines of this character as previously constructed, the batter placed on the baking pan surface has been pressed by the lid so as to extend over the entire surface of the pan with portions of the batter extending beyond the four edges of the pan in an irregular manner. This, of course, requires that all four edges of the wafer sheets as baked must be trimmed, which is an operation requiring a considerable amount of time and labor. It has previously been considered necessary to leave the four edges of the pan open for the escape of steam, which is formed by the rather high heat which is maintained.

I have found that the trimming of the baked sheets on two opposite sides may be done away with by providing raised side portions on the opposite sides of the pan, so that the side edges of the batter sheet will be formed smoothly and regularly against these side portions. In this case, of course, the excess batter will be squeezed out of the open ends of the pan, so that the sheet will still have to be trimmed on its end edges. The steam which is formed in the batter during the baking will escape through the spaces between the pan and its lid at the ends of the pan.

With such an arrangement difficulties are likely to ensue if any space is left within the mass of batter on a pan within which steam may be trapped. With a pan of greater length than width, it is desirable to have the batter deposited thereon in an elongated mass or puddle so that pressure on the same will cause it to spread over the entire pan surface. If, however, the batter is deposited by two nozzles, separated in the direction of movement of the pan, a space is likely to be left between the forward and rear puddle of batter, in which steam may be trapped. In case raised side edge portions are provided on the pan, there may be no means of escape for this trapped steam.

I overcome this difficulty by depositing the batter on each pan in such a manner that the same will form one continuous elongated puddle without any space for steam. This is accomplished in the preferred form of my invention by causing the batter which flows from the single delivery nozzle to be received in a trough having two or more openings therein through which the batter flows on to the pan, these openings being properly spaced apart and of suitable area, so that the batter which flows through the same will form puddles on the pan which join together to form one continuous elongated puddle.

Figure 2:
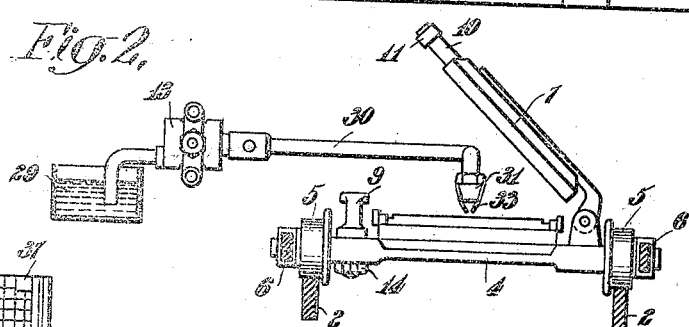
Figure 3:
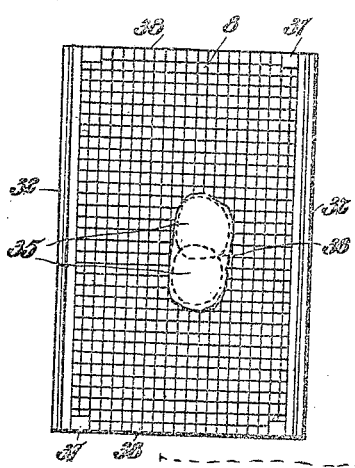
Figure 5:
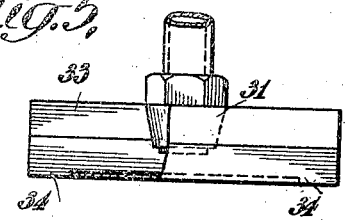
Figure 4:
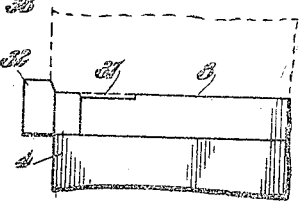

In order that my invention may be more clearly understood, attention is hereby directed to the accompanying drawings forming part of this application and illustrating one embodiment of my invention. In the drawings, Figure 1 represents a partial side elevation of a machine equipped with my invention; Fig. 2 is a cross section taken on line 2—2 of Fig. 1; Fig. 3 is a plan view of a pan with the lid removed; Fig. 4 is an enlarged partial end view of the pan shown in Fig. 3; and Fig. 5 is an enlarged end elevation of the delivery nozzle with the delivery trough secured thereto.

Referring to the drawings, a machine is indicated having a frame 1 and a continuous track 2 having upper and lower portions connected by curved portions at each end, one of which is shown at 3. An endless chain of baking pans, such as the pan 4, is arranged to continuously progress over the track, the pans being supposed to move on the upper portion of the track in the direction from right to left, referring to Fig. 1.

Each pan is provided with wheels or rollers 5, 5, which rotate in contact with the track, the pans being connected by links 6. The travel of the chain of pans may be effected in any convenient way, not shown.

Each pan is provided with a pivoted lid 7 which is adapted to close and press firmly against the pan surface 8 on which the batter is placed. Each lid may be located in its closed position by means of a locking bolt 9 which is adapted to extend through a slot in the lid, the location of the slot being indicated at 10, the bolt 9 being rotated into locking position after it has been inserted through the slot at 10.

The oven through which the pans pass is located at the left of Fig. 1. After a pan has passed out of the oven, the bolt 9 is rotated into its unlocking position in which the head of the bolt is arranged parallel to the slot at 10, by some suitable means such as is described in the patent to Baker referred to. As the pan then ascends to the upper portion of track 2, the lid 7 is opened by the engagement of a lug 11 on the lid with a pair of curved rails 12, 12. The baked wafer is then removed and a quantity of batter is forced or caused to flow on the pan by a valve mechanism indicated at 13. After this, in the travel of the pan, the rails 12 descend into position to lower and release the lid 7, the same being locked in its closed position by the rotation of locking bolt 9 at an appropriate point in the travel of the pan. The bolt 9 may be provided with a star wheel 14 which is rotated by engagement with suitable stops for locking and unlocking the lid.

The details of the mechanism described are not illustrated in full for the reason that the same are old, and that suitable constructions are described in the patent to Baker referred to. The automatic valve structure for injecting the batter on the pans is also old, and is, therefore, not illustrated and described in detail herein. The valve structure 13 reciprocates on rails 15. It is moved to the left referring to Fig. 1, at the same speed as the pans, by the engagement of devices on the trunnions of the pans, with a vertical sliding member 16 on the valve device. Thus each of the sectors 17 may in turn engage against the member 16 and move the valve device to the left. In Fig. 1 the sector 17 on the trunnion or pivot pin 18 is supposed to be in engagement with block 16.

At the end of the movement referred to of the valve structure, the member 16 is lifted out of engagement with the sector 17 which has been in contact with the same, by the engagement of a stationary pin 19 with a cam slot 20 in member 16. Thereafter, the next sector 17', in advance of the sector just referred to, engages a sector 21 mounted on a fixed pivot 22 and rotates the same, the arm 23 moving with the sector and swinging a link 24 to the right, referring to Fig. 1, this link being connected to the valve device 13 at 25. As the valve device moves to the right, a fixed pin 26 engages in the cam groove 20 to force member 16 downwardly into its lower position.

As the valve structure 13 moves to the left and to the right, the rods 27 and 28 thereon engage, at the two extremities of movement of the valve structure, against fixed stops (not shown). Batter in fluid form is delivered by the valve structure from a tank 29 through pipe 30 and nozzle 31. A predetermined quantity of batter is forced or caused to flow through the nozzle, each reciprocation of the valve structure, while the nozzle is moving in the same direction as the pan beneath the same and at the same speed. The means by which the batter is forced through pipe 30 and nozzle 31 is not material to the present invention, and it seems to be sufficient to state that in the structure indicated in the drawings, the delivery mechanism is actuated by the engagement of rods 27 and 28 with their fixed stops at the two limits of movement of the valve device 13.

Each pan 4 is provided with a suitable flat surface 8 on which the batter is positioned. In accordance with my invention, I secure a pair of side rails 32, 32 at the side edges of each pan, these rails being slightly elevated above the level of the surface 8, as is shown in Fig. 4. The lid 7 when lowered and locked in its closed position, fits between the side rails 32.

In order to obtain the best arrangement of the batter on each pan, I preferably use a single nozzle 31 as stated. A trough 33, preferably formed of suitable sheet metal, is secured to nozzle 31, as is indicated in Figs. 2 and 5, so that the batter delivered from the nozzle will fall into this trough. The trough extends lengthwise of the pan 8 beneath the same, that is, in the direction of travel of the chain of pans. The trough is provided with suitable delivery openings, preferably a pair of openings 34, 34, located in the bottom of the trough adjacent its two ends. The batter dropping through these openings forms concentric overlapping circular puddles on pan 8 indicated in dotted lines in Fig. 3 at 35, 35, these puddles flowing together to form a single elongated or oval puddle 36. The spacing of the delivery openings 34 in trough 33 should be so arranged, in connection with the amount of batter to be dropped and the rate of flow of the same as to cause the formation of the puddle 36, as stated, without any space within the same for the entrapping of steam.

When the lid 7 is pressed down and locked in closed position, the batter will be spread entirely over the surface 8 of the pan. Steam which is formed during the baking flows out of the end of the pan, vents 37 preferably being provided at the end edges of the pan adjacent the corners. When a wafer sheet is removed from a pan, the side edges of the same will be regular and smooth because of their formation against the rails 32, it only being necessary to trim off the slight amounts of batter which had been pressed over the end edges 38 of the pan. The wafer sheets will accordingly be formed with less labor and less wastage of material than in the former practice.

What I claim is:—

1. In wafer-baking apparatus, the combination of an endless chain of elongated baking pans having movement in one direction, said pans having flat body portions with raised edge portions at their longitudinal edges only and lids adapted to press upon batter on said body portions between said edge portions, means for raising said lids at a point in the progression of said pans, means for placing a puddle of batter centrally on each of said pans, which puddle is continuous in the direction of the length of the pan, and means for thereafter pressing down said lids, said pans having their transverse edges out of contact with each other when said lids are pressed down, to afford space for the escape of steam.

2. In wafer-baking apparatus, the combination of an endless chain of elongated baking pans having movement in one direction, said pans having flat body portions with raised edge portions at their longitudinal edges only, and lids adapted to press upon batter on said body portions between said edge portions, means for raising said lids at a point in the progression of said pans, means for placing a quantity of batter on each of said pans, in such manner that the same will form an elongated puddle on each pan, which puddle is continuous in the direction of the length of the pan, and means for thereafter pressing down said lids, said pans having their transverse edges out of contact with each other when said lids are pressed down, to afford space for the escape of steam.

3. In wafer-baking apparatus, the combination of an endless chain of separated elongated baking pans having movement in one direction, said pans having flat body portions with raised edge portions at their longitudinal edges only, and lids adapted to press upon batter on said body portions between said edge portions, means for raising said lids at a point in the progression of said pans, a nozzle, means for causing the passage therethrough of a desired quantity of batter, each time that a pan with raised lid comes beneath the same, a trough receiving batter from said nozzle, having separated delivery openings therein, and means for pressing down said lids after batter has been deposited on said pans, said nozzzle, means for passing batter therethrough, and trough being so arranged that a puddle of batter, continuous in the direction of the length of the pan, will be formed on each pan.

This specification signed and witnessed this 7th day of July, 1919.

MARTIN H. BERGEN.

Witnesses:
LESLIE H. GUNTER,
F. H. ZARNITZ.